US006871829B2

(12) United States Patent
Shannon, Jr.

(10) Patent No.: US 6,871,829 B2
(45) Date of Patent: Mar. 29, 2005

(54) TELESCOPICALLY ADJUSTABLE BATTERY HOLDDOWN

(75) Inventor: John K. Shannon, Jr., Franksville, WI (US)

(73) Assignee: Quick Cable Corporation, Franksville, WI (US)

( * ) Notice: Subject to any disclaimer, the term of this patent is extended or adjusted under 35 U.S.C. 154(b) by 180 days.

(21) Appl. No.: 10/349,818

(22) Filed: Jan. 23, 2003

(65) Prior Publication Data

US 2004/0144908 A1 Jul. 29, 2004

(51) Int. Cl.$^7$ .......................... A47B 97/00; B60R 16/04
(52) U.S. Cl. ...................... 248/505; 248/503; 180/68.5
(58) Field of Search ................ 248/505, 680, 248/201, 229.14, 228.3, 230.5, 231.41, 298.1, 500, 503, 510; 180/685

(56) References Cited

U.S. PATENT DOCUMENTS

| | | | |
|---|---|---|---|
| 457,781 A | * 8/1891 | Josef ...................... 160/368.2 |
| 833,613 A | 10/1906 | Malser | |
| 1,043,952 A | 11/1912 | Richardson | |
| 2,402,682 A | * 6/1946 | Shriro et al. ................ 248/505 |
| 2,415,284 A | 2/1947 | Holman et al. | |
| 2,517,927 A | 8/1950 | Reed | |
| 2,812,918 A | 11/1957 | Longino | |
| 2,849,074 A | * 8/1958 | Key et al. ................ 180/68.5 |
| 2,853,143 A | 9/1958 | Bergman | |
| 3,498,400 A | * 3/1970 | Hysmith .................... 180/68.5 |
| 3,557,895 A | * 1/1971 | Thomas ..................... 180/68.5 |
| 3,826,115 A | 7/1974 | Davis | |
| 3,834,479 A | 9/1974 | Bowers et al. | |
| 3,856,248 A | 12/1974 | Labelle | |
| 3,866,704 A | * 2/1975 | Bowers et al. ............. 180/68.5 |
| 4,252,206 A | * 2/1981 | Burkholder et al. ....... 180/68.5 |
| 4,455,692 A | * 6/1984 | Hegge et al. ................ 4/227.1 |
| 4,565,256 A | 1/1986 | Valdez | |
| 4,754,827 A | 7/1988 | Hirabayashi | |
| 4,984,690 A | 1/1991 | King et al. | |
| 5,052,198 A | * 10/1991 | Watts ......................... 248/503 |
| D321,856 S | * 11/1991 | Whitley et al. ............. D13/119 |
| 5,086,860 A | * 2/1992 | Francis et al. ............. 180/68.5 |
| 5,222,711 A | * 6/1993 | Bell ........................... 248/503 |
| 5,228,532 A | * 7/1993 | Browning et al. ......... 180/68.5 |
| 5,377,947 A | * 1/1995 | Johnson ....................... 248/503 |
| 5,547,160 A | * 8/1996 | Johnson ....................... 248/503 |
| 5,833,193 A | * 11/1998 | Derda et al. ............. 248/298.1 |

* cited by examiner

*Primary Examiner*—Anita M. King
(74) *Attorney, Agent, or Firm*—Jansson, Shupe & Munger, Ltd.

(57) ABSTRACT

A telescopically adjustable holddown (10) is disclosed including first and second brackets (16,18) and drawing elements (12) adapted to extend between a battery tray (14) and the brackets for drawing the brackets toward the battery tray to hold a battery (2). The brackets each include a generally L-shaped clamp (20) having top (22) and side members (24) for abutting the top (3) and sides (4) of the battery. An ear (26) extends from each side member and includes an aperture (36) for receiving a bolt (12) extending from the battery tray. Each bracket includes a cross rod (17,19) with second cross rod (19) having a cavity (46) for slidably receiving the first cross rod (17). The cavity requires that relative movement of the first and second brackets be substantially along the cavity axis (50) to allow telescopic assembly of the first and second brackets. The brackets are drawn toward the battery tray by tightening nuts (13) on the bolts to prevent relative movement of the brackets.

20 Claims, 4 Drawing Sheets

TELESCOPICALLY ADJUSTABLE BATTERY HOLDDOWN

FIELD OF THE INVENTION

The present invention generally relates to devices for restraining objects of different sizes, particularly to devices for restraining batteries of different widths, and more particularly to battery holddowns for batteries supported in a battery tray.

BACKGROUND OF THE INVENTION

A conventional manner for restraining batteries such as in the automotive industry is to support the battery in a tray and utilize a battery holddown which abuts the top of the battery and is drawn toward the tray utilizing bolts. It can also be appreciated that batteries come in a variety of case sizes depending upon the power requirements, the particular battery design, and the like and also depending upon the particular manufacturer. Often a replacement or substitute battery is of a different case size than the original battery such that the holddown for the original battery cannot be used with the replacement or substitute battery. Thus, added expense is encountered by the automobile owner because in addition to the battery, at least the holddown of the battery restraint system also has to be replaced. Additionally, added expense to the manufacturer and supplier of battery holddowns occurs as battery holddowns for all sizes of batteries manufactured are generally required to be maintained in inventory.

Although known, most adjustable battery holddowns to fit different sizes of batteries in the past have not achieved the same commercial success as nonadjustable battery holddowns. Particularly, the adjustment mechanisms of prior adjustable battery holddowns were typically of a complicated design and were susceptible to corrosion from battery acid and other elements in the environment. Although adjustable when manufactured, corrosion often locked components together or otherwise prevented adjustment such that replacement was necessary if a different size battery was desired to be held. Additionally, some adjustable battery holddowns were adjustable in only a single direction such as length such that they could not be utilized with batteries of different sizes in the direction which they were not adjustable.

U.S. Pat. Nos. 5,377,947 and 5,547,160 to Johnson were intended to overcome these limitations in the prior art. However, the Johnson devices present other problems in use. For instance, the brackets described in the Johnson patents require relative pivoting and translational movement of the brackets during assembly and disassembly. The disassembly process thus requires that the nuts restraining the brackets be almost completely, if not completely, removed from the bracket in order to allow the first pivoting motion. In addition, the Johnson devices provide for adjustment of length only to predetermined increments and do not provide for length adjustment while engaging the bolts and battery tray. The Johnson brackets are also difficult to handle since, when not drawn tight against a battery they separate.

A length adjustable battery restraint is also disclosed in U.S. Pat. No. 4,252,206 to Burkholder et al. The Burkholder et al. restraint utilizes two support members which extend upwardly from a frame and a strap structure which restrains a battery. While Burkholder et al. allows for adjustment of the length of strap structure, it requires pivoting of the structure, assembly of straps with respect to the strap structure, pivoting of the structure back into restraining position and connection of the strap to a support member. The use of numerous parts to allow length adjustment is costly and complicated. In addition, Burkholder et al. does not provide for height adjustment.

Thus, a need continues to exist for an improved battery holddown which is able to restrain batteries of different sizes and which overcomes the problems which were encountered by prior adjustable battery holddowns.

OBJECTS OF THE INVENTION

A primary object of the present invention is to provide a novel battery holddown.

Another object of the present invention is to provide a novel battery holddown which fits batteries with different lengths or widths and heights.

Another object of the present invention is to provide a battery holddown including cross rods which extend across the top of the battery and are telescopically, slidably adjustable.

Another object of the present invention to provide a battery holddown which is not susceptible to locking at fixed positions due to corrosion or the like.

Another object of the present invention is to provide a battery holddown which allows for length adjustment without requiring disassembly.

Another object of the present invention is to provide a battery holddown which allows for length adjustment solely by relative linear movement of the brackets.

Another object of the present invention is to provide a battery holddown which provides brackets that remain engaged when not connected to the battery tray.

Yet another object of the present invention is to provide a battery holddown which allows infinite length adjustment to provide for use with batteries of any length.

Still another object of the present invention is to provide a battery holddown including a cross rod having a cavity which receives another cross rod.

These and further objects and advantages of the present invention will be apparent from the disclosure and discussion herein.

SUMMARY OF THE INVENTION

This invention is an improved adjustable battery holddown which allows height adjustment and telescopic length adjustment. The invention represents a significant advance over the state of the art by providing novel elements, including telescopic brackets which are independent of the battery tray and can be tightened onto a battery via drawing elements.

The telescopically adjustable holddown includes (a) a first bracket having a first top member for abutting the top of a battery, i.e., a battery assembly comprising a single or multiple batteries, a first side member for abutting the first side of the battery, and a first cross rod for extending over the top of the battery; (b) a second bracket having a second top member for abutting the top of the battery, a second side member for abutting the second side of the battery, a second cross rod for extending over the top of the battery, and a cavity for slidably receiving the first cross rod, the cavity defining a cavity axis; (c) a first drawing element adapted to extend between the battery tray and the first bracket for drawing the first bracket toward the battery tray to hold the battery between the battery tray and the first bracket; and (d)

a second drawing element adapted to extend between the battery tray and the second bracket for drawing the second bracket toward the battery tray to hold the battery between the battery tray and the second bracket.

Length adjustment of the holddown preferably requires relative movement between the first and second brackets substantially along the cavity axis only. This is due to the shape of the cavity which requires that relative movement between the first and second brackets be substantially along the cavity axis to allow the first and second brackets to be assembled and disassembled telescopically. The cavity axis is preferably substantially perpendicular to the lateral direction defined by the preferably substantially parallel first and second sides of a battery. The cavity preferably extends substantially the entire length.

The first cross rod and cavity are preferably formed to provide for infinite adjustment, i.e., adjustment along a continuum of extremely slight increments, of distance between the first and second side members, i.e., the "effective length" of the holddown, when the first and second brackets are assembled, thereby allowing use of the holddown with batteries of varying sizes. The second cross rod preferably forms the cavity, which may be completely bounded by the second cross rod or may be bounded on three sides and have an opening along a side of the cavity. The cavity preferably extends substantially the entire length of the second cross rod.

In a certain preferred embodiment, the second cross rod is U-shaped and includes a top wall and spaced apart side walls which bound the cavity. It is preferable that the spacing between the side walls be at least equal to the width of the first cross rod. In a more preferred embodiment a sleeve portion extends between the side wall and is spaced from the top wall such that the top wall, side walls and sleeve portion define a completely bounded opening to the cavity. It is preferable that the spacing between the top wall and sleeve portion is at least equal to the height of the first cross rod.

In a preferred embodiment, the first and second drawing elements include ears integrally formed as a single piece with the cross rods and extending from the side members in a direction opposite the top members. The ears preferably include apertures through which bolts extend for connection between the brackets and the battery tray. It is preferred that such bolts are included in the drawing elements and provide that the first and second brackets can be drawn toward the battery tray to hold the battery between the battery tray and the brackets by inserting the first and second bolts through the first and second apertures, respectively, and tightening a nut on each of the first and second bolts.

In an alternate description of the invention, the adjustable holddown includes first and second brackets, each bracket having a top member for abutting the top of the battery, a side member for abutting the sides of the battery, a cross rod for extending over the top of the battery, and a mount for connecting with a drawing element for drawing the first bracket toward the battery tray to hold the battery between the battery tray and the first bracket. The second bracket further includes a cavity for slidably receiving the first cross rod and defining a cavity axis. It is preferred that the first cross rod and cavity be dimensioned such that, upon receipt of the first cross rod within the cavity the first and second brackets remain engaged to one another without connection to the drawing element. Length adjustment of the holddown preferably requires only relative movement between the first and second brackets substantially along the cavity axis.

The length of the adjustable holddown is preferably adjustable regardless of whether the holddown is connected or not connected to the drawing element. It is also preferable that the first cross rod and cavity be dimensioned such that, upon receipt of the first cross rod within the cavity unintentional separation of the first and second brackets is prevented.

In a certain preferred embodiment, the second cross rod includes a top wall and spaced side walls and a sleeve portion spaced from the top wall. The top wall and side walls define the cavity and the top wall, side walls and sleeve portion define an opening to the cavity, the opening being completely bounded. In such an embodiment the spacing between the top wall and sleeve portion is at least equal to the height of the first cross rod and the spacing between the side walls is at least equal to the width of the first cross rod.

It is further preferred that each bracket include an ear integrally formed as a single piece with the cross rod and extending from the first side member in a direction opposite the respective top member. Each ear preferably includes a mount, the mount preferably being an aperture.

In this alternate description of the invention, the drawing element preferably includes first and second bolts for connection with respect to the battery tray by extending through a respective aperture. Such bolts provide for drawing the first and second brackets toward the battery tray to hold the battery between the battery tray and the brackets by inserting the bolts through the apertures and tightening a nut on each bolt.

The invention can also be described as a method of holding a battery assembly, which may include multiple batteries, in a battery tray: Such method includes the steps of providing brackets having top members for abutting the top of the assembly, side members for abutting opposite sides of the assembly, cross rods for extending over the top of the assembly, and mounts, with the second bracket including a cavity for slidably receiving the first cross rod; providing a drawing element; inserting the first cross rod into the cavity a desired depth such that the space between the first and second side members is of a desired effective length substantially equal to the width of the assembly; connecting the drawing element to the first and second mounts; and tightening the drawing element such the brackets are drawn toward the battery tray to hold the assembly between the battery tray and the brackets. In such a method the first and second side members abut the opposite sides of the assembly, the first and second top members abut the top of the assembly and the assembly is sandwiched between the brackets and the tray. It is provided that the inserting and connecting steps may be performed in any order.

BRIEF DESCRIPTION OF THE DRAWINGS

The illustrative embodiment may best be described by reference to the accompanying drawings where.

The Figures are drawn for ease of explanation of the basic teachings of the present invention only; the extensions of the Figure with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

When the terms "top", "bottom", "left", "right", "side", "vertical", "horizontal", "upright", or similar terms are used herein, it should be understood that these terms have reference only to the structure shown in the drawings as it would appear to a person viewing the drawings and are utilized only to facilitate describing the invention.

The term "tray" is used herein to designate a platform to which a battery is to be anchored. While in the automotive field, such platforms are typically shaped with a bottom portion and side portions extending upward from the bottom portion, in other fields such platforms may simply include a bottom portion. For instance, a battery may be anchored to a bench or shelf like structure during uses in laboratory or other similar settings. Other platforms for supporting batteries are also contemplated as being trays.

DETAILED DESCRIPTION OF PREFERRED EMBODIMENTS

Figure 1:
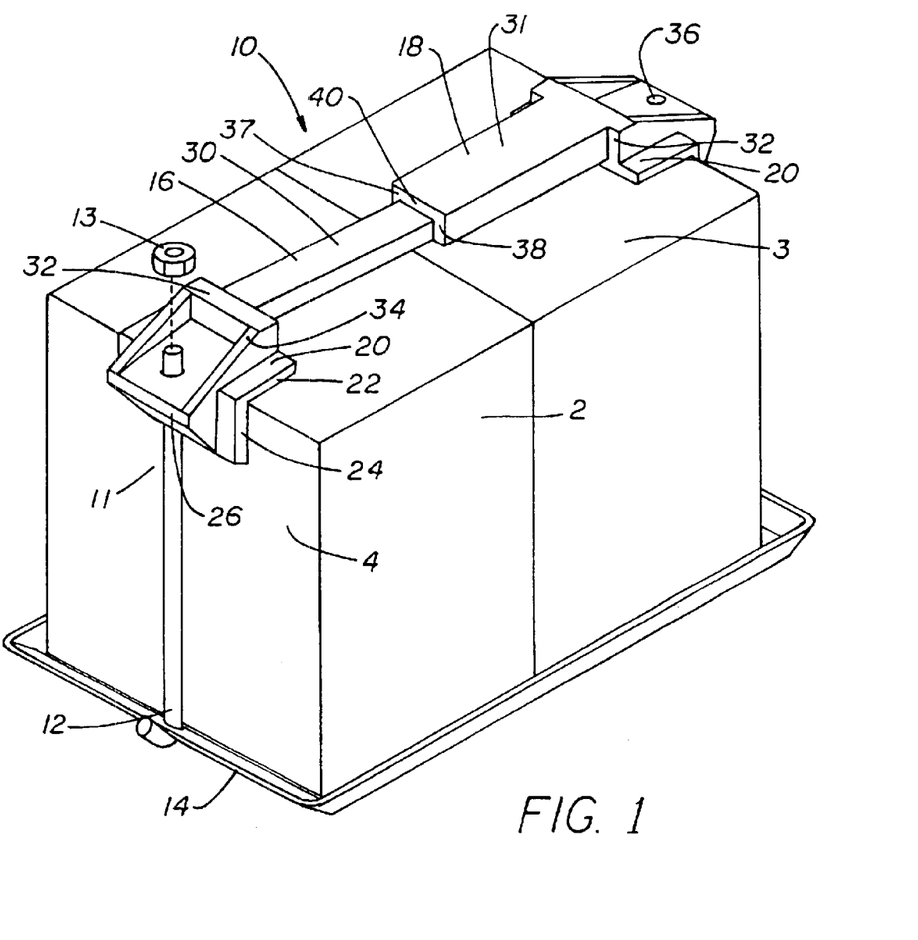
FIG. 1 shows a perspective view of a battery restraining device including a battery holddown according to the preferred teachings of the present invention.

A battery holddown according to the preferred teachings of the present invention is shown in the figures and is generally designated 10. Holddown 10 in the most preferred form is used with a pair of upright bolts 12 which extend from a tray 14 which supports the desired battery assembly 2. Bolts 12 and tray 14 can be of any conventional design such as those utilized in vehicles, heavy equipment, and like applications. As shown in FIG. 1, bolts 12 have a hooked lower end which is fitted through an aperture in tray 14. Holddown 10 generally includes first and second battery brackets 16,18. Brackets 16,18 generally include L-shaped clamps 20. Clamps 20 each include a first portion such as a top member or plate 22 for abutting with the top 3 of battery assembly 2 and a second portion such as a side member or plate 24 for abutting with the side 4 of battery assembly 2 and extending generally perpendicular to top plate 22. Top and side plates 22 and 24 have a generally equal length, with the thickness of top plates 22 being larger than, and in the most preferred form being generally double, the thickness of side plates 22.

Clamps 20 each further include an ear 26 extending from side plate 24, preferably substantially perpendicular to side plate 24 and parallel to top plate 22, and most preferably further connected to top and side plates 22,24 via reinforcement frames 34. In the preferred form, ear 26 has a length slightly greater than the length of top plate 22. Ear 26 has a thickness generally equal to or slightly larger than the thickness of top plate 22.

First bracket 16 has a first cross rod 17 and second bracket 18 has a second cross rod 19, each cross rod 18,19 extending over the top of the battery assembly 2. Each cross rod 18,19 includes a horizontal portion 30,31 which extends from the clamp 20 substantially parallel to the top of the battery assembly 2 and top plate 22. In the preferred form shown, each cross rod 18,19 further includes a vertical portion 32 extending vertically upward from top plate 22 and in the most preferred form generally along the free edge thereof Vertical portion 32 has a width generally thicker than ear 26 in the most preferred form. Reinforcement frames 34 extend between vertical portion 32 and top plate 22 and ear 26 adjacent to the edges of vertical portion 32 and ear 26. An aperture 36 is formed in ear 26 to serve as a mount to drawing element 11, which preferably comprises bolts 12 and nuts 13. As shown aperture 36 slidably receives the upper ends of bolts 12 and in the preferred form is centrally located between frames 34.

Figure 2:
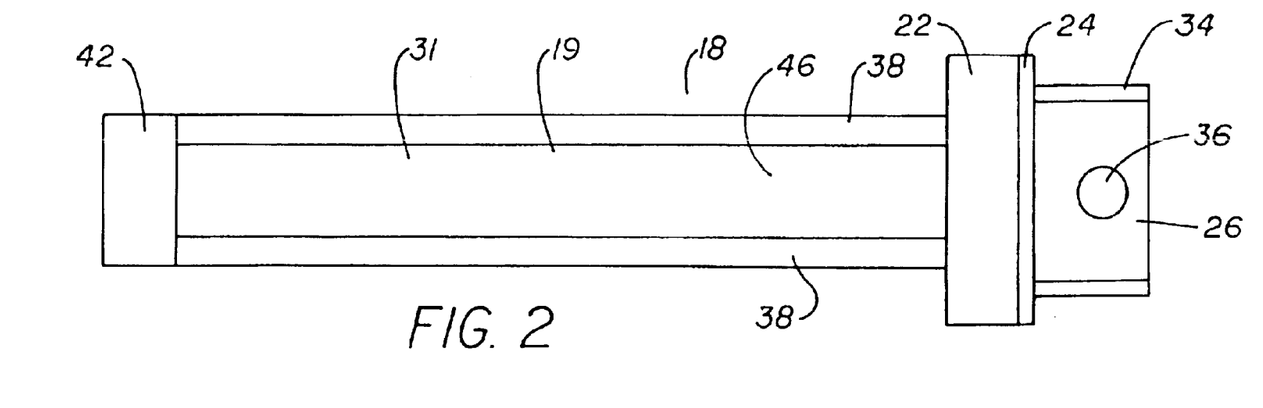
FIG. 2 is a view of the bottom of the second bracket according to the preferred teachings of the present invention.
Figure 3:
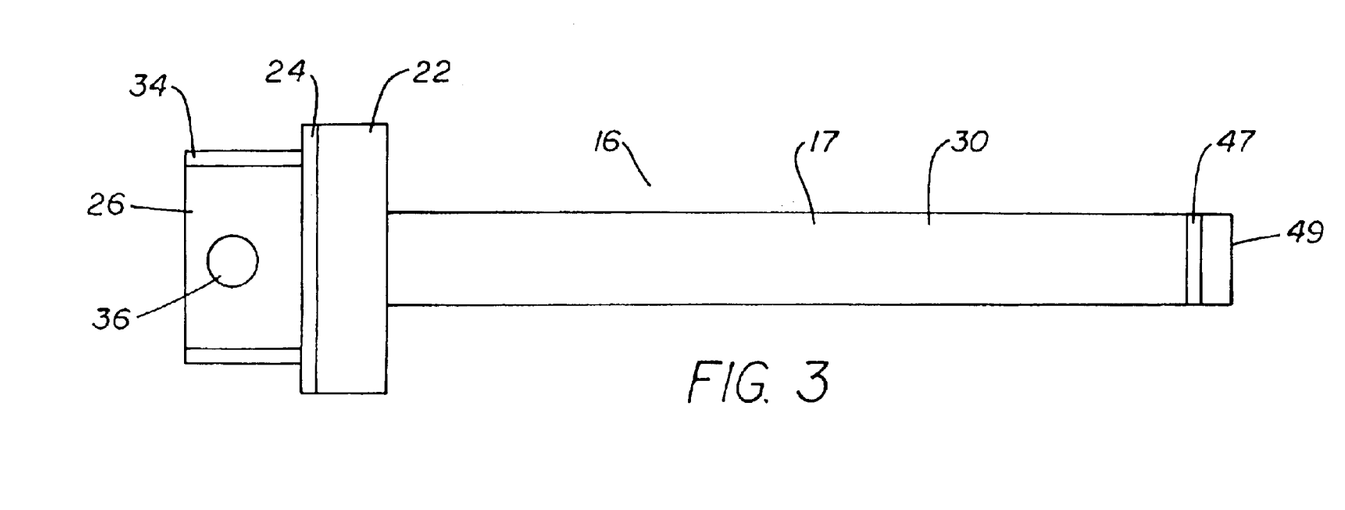
FIG. 3 is a view of the bottom of the first bracket according to the preferred teachings of the present invention.
Figure 4:
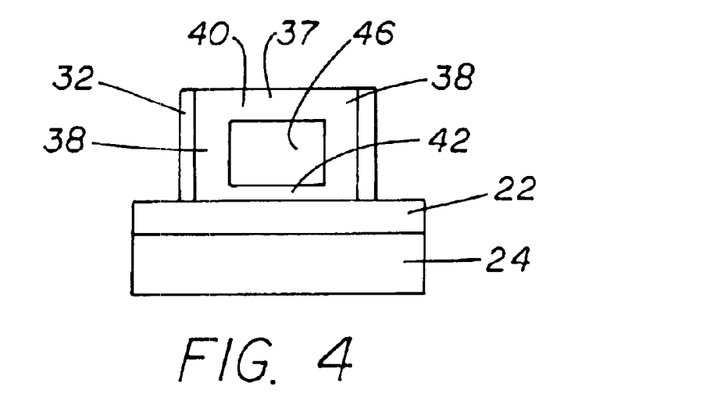
FIG. 4 is a view of the end of the second bracket which received the first bracket according to the preferred teachings of the present invention.
Figure 5:
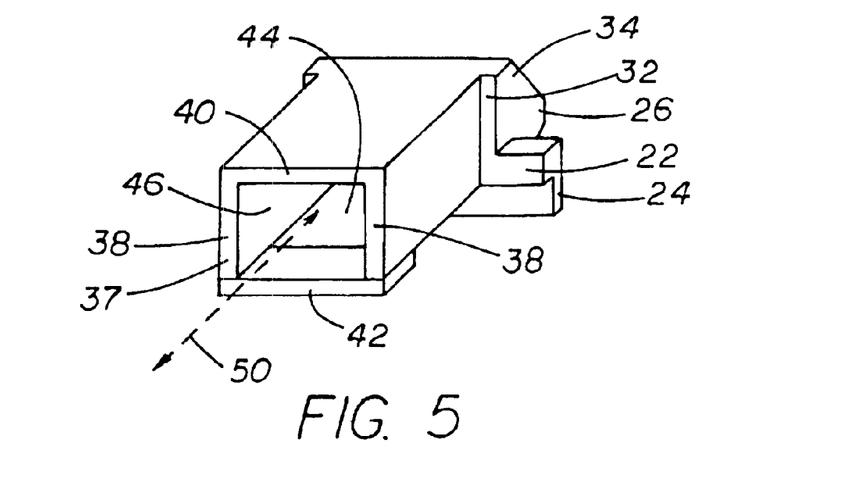
FIG. 5 is a perspective view of the second bracket according to the preferred teachings of the present invention.
Figure 6:
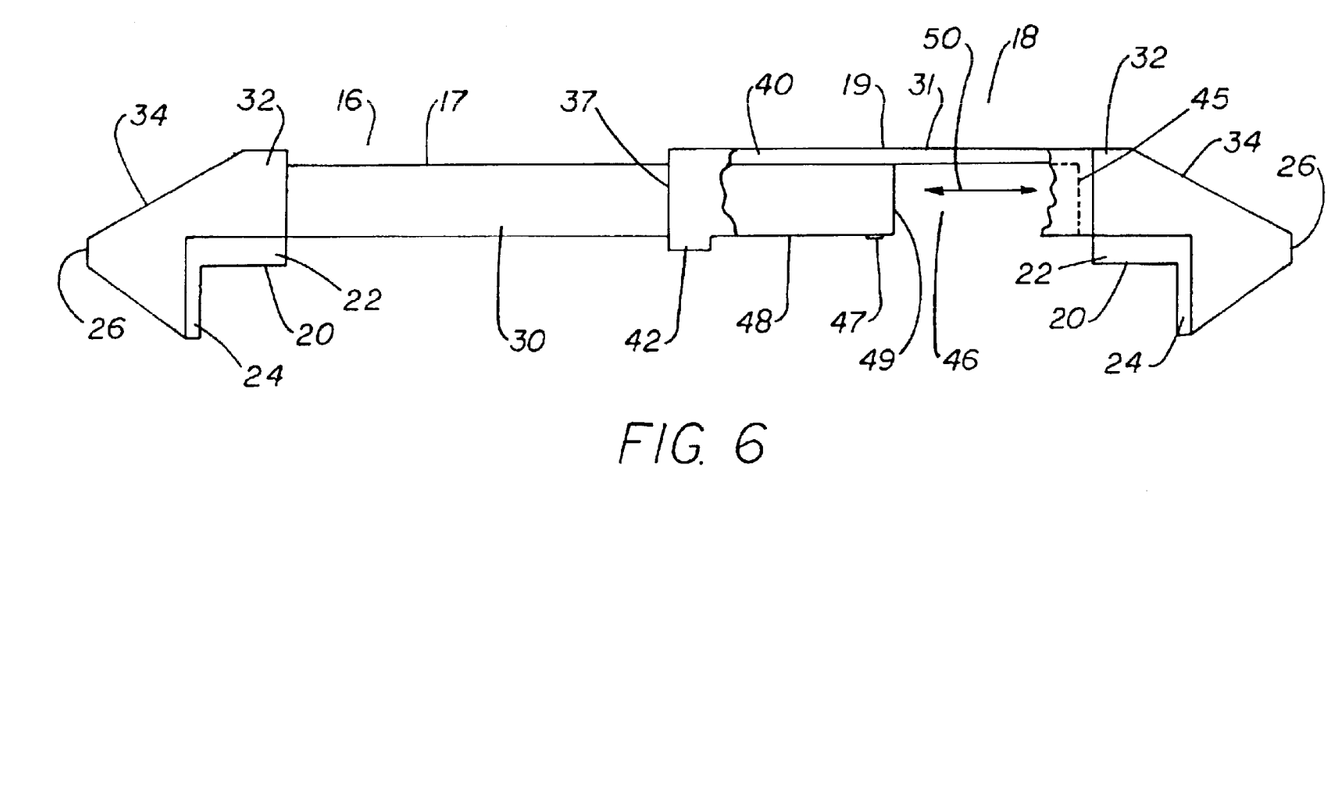
FIG. 6 is a side view of the holddown with a portion broken away to show internal features.

Each horizontal portion 30,31 is linear and has an elongated length which is less than the length or width of the battery assembly 2 and in the most preferred form has a length which is greater than one-half of the length or width of the battery assembly 2. In the preferred form, first horizontal portion 30 has a cross section of a parallelogram shape and more preferably is substantially square. Second horizontal portion 31 preferably has a U-shaped cross-section having an open bottom end and includes first and second, vertical, parallel side walls 38 interconnected by a horizontal top wall 40. A sleeve portion 42 (shown in FIGS. 4 and 5) is positioned at distal end 37 of second bracket 18 and connects side walls 38. Sleeve portion 42 is preferably substantially parallel to top wall 40 and, together with side walls 38 and top wall 40, forms enclosed opening 44 which leads to cavity 46 (shown in FIGS. 2, 4 and 5) which is the space bounded on three sides by top wall 40 and side walls 38.

Opening 44 and cavity 46 are sized to slidingly receive first cross rod 17 during relative movement in the direction of cavity axis 50. First cross rod 17 may include a rib 47 rising from the bottom surface 48 near the distal end 49 of first cross rod 17. Rib 47 is preferably sized such that first cross rod 17 cannot be easily inserted into or removed from cavity 46 due to friction between rib 47 and sleeve portion 42.

In the preferred form, brackets 16,18 are each of a one-piece construction and in the most preferred form are of an integral construction which is cast from synthetic material which is not subject to corrosion due to exposure to the acid and other contents of the battery and the environment.

Now that the basic construction of holddown 10 according to the preferred teachings of the present invention has been explained, the installation and subtle features of holddown 1 can be set forth and appreciated. Specifically, brackets 16,18 can be positioned to be opposite to each other with first cross rod 17 aligned with cavity axis 50. Then brackets 16,18 can be moved toward one another such that distal end 49 of bracket 16 enters cavity 46. Brackets 16,18 are preferably moved until side plates 24 are spaced from each other by a distance substantially equal to the length or width of battery assembly 2 (depending on whether brackets 16,18 are positioned to extend along the length or width of battery assembly 2). Brackets 16,18 can be positioned at that time on battery assembly 2 with bolts 12 extending through apertures 36 and with top plates 22 abutting with top 3 of battery assembly 2, side plates 24 of brackets 16,18 abutting with opposite sides 4 of the battery, and horizontal portions 30,31 extending horizontally and substantially parallel to top 3 of battery assembly 2. At that time, nuts 13 or the like can be threaded on bolts 12 to draw ears 26, and thus clamps 20, toward tray 14 to sandwich battery assembly 2 between tray 14 and holddown 10.

It should be appreciated that cross rods 17,19 could be manufactured with offset vertical portions 38 to allow horizontal portions 30,31 to avoid obstructions such as fill caps on the top of the battery by passing over them in the most preferred form.

While cavity 46 allows for incremental adjustment of the effective length of the holddown, i.e., the distance between side plates 24, by sliding first cross rod 17 in and out of cavity 46, sleeve portion 42 prevents brackets 16,18 from becoming separated during times when holddown 10 is not sandwiched between nuts 13 and tray 14. Specifically, relative vertical movement between brackets 16,18 is prevented by sleeve portion 42. Rotation of horizontal portions 30,31 is prevented by the non-rotatable shape of the cross sections of horizontal portion 30 and cavity 46 and by the abutment of top plates 22 with the top of the battery. The preferred holddown 10 may includes reciprocating ridges on the cavity surface of upper wall 40 and the upper surface of first cross rod 17 such that unintentional relative sliding movement between the brackets 16,18 is prevented. However, the attachment of brackets 16,18 to tray 14 via bolts 12 is typically sufficient to prevent such unintentional movement. Thus, holddown 10 according to the preferred teachings of the present invention resists relative movement between brackets 16,18 when nuts 13 are tightened on bolt 12 causing the first cross rod 17 to be bound in cavity 46 and prevent sliding and other relative movement therebetween to securely hold battery assembly 2.

It should be noted that the preferred placement of horizontal portion 30 relative to the center of aperture 36 is advantageous in that apertures 36 of brackets 16,18 are directly across from each other on opposite sides of the battery to align bolts 12.

Although brackets 16,18 in the most preferred form are shown as being of a cast, integral design, other constructions of holddown 10 according to the teachings of the present invention can be utilized. For example, a metal bar could be utilized for horizontal portion 30, could be bent to form any offset such as vertical portion 32, and could be bent into a loop to form ear 26 and aperture 36. Sleeve portion 42 could be formed by bending the metal bar or as a separate piece attached such as by welding to the metal bar. A suitable coating could be applied to protect the metal from corrosion and other elements of the environment. Additionally, it can be appreciated that horizontal portion 30 and cavity 46 could have other types of cross sections such as circular cross sections.

It should then be appreciated that holddown 10 according to the preferred teachings of the present invention can be utilized on batteries having different widths. Specifically, brackets 16,18 can be positioned relative to each other at a maximum spacing with first cross rod 17 barely entering cavity 46 to a minimum spacing where distal end 49 of first cross rod 17 abuts with cavity end wall 45 of second cross rod 19, and at any of the spacings therebetween. Thus, battery holddown 10 of the present invention can hold batteries of differing widths between the maximum and minimum spacing thereof Additionally, top and side plates 22,24 of clamps 20 of the preferred form of the present invention are not dependent upon the length of the battery and thus battery holddown 10 of the present invention can hold batteries of differing lengths. Furthermore, brackets 16,18 can be manufactured with horizontal portions 30,31 of any desired length and cross sectional size to fit different ranges of battery widths. Further, although in the preferred form, horizontal portions 30,31 of brackets 16,18 are of the same length, bracket 16 could have horizontal portion 30 of a different length than horizontal portion 31 of bracket 18.

It should be noted that holddown 10 according to the teachings of the present invention can be utilized on batteries located in low clearance environments such as often provided in automobile engine compartments because holddown 10 is located closely adjacent and generally corresponds to the configuration of the top of the battery.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

Various modes of carrying out the invention are contemplated as being within the scope of the following claims which particularly point out and distinctly claim the subject matter regarded as the invention.

What is claimed is:

1. A telescopically adjustable holddown for a battery positioned in a battery tray, the battery having a top and first and second opposite sides, the holddown comprising:
    a first bracket having a first top member for abutting the top of the battery, a first side member for abutting the first side of the battery, and a first cross rod for extending over the top of the battery;
    a second bracket having a second top member for abutting the top of the battery, a second side member for abutting the second side of the battery, a second cross rod for extending over the top of the battery, and a cavity for slidably receiving the first cross rod, the cavity defining a cavity axis;
    a first drawing element adapted to extend between the battery tray and the first bracket for drawing the first bracket toward the battery tray to hold the battery between the battery tray and the first bracket; and
    a second drawing element adapted to extend between the battery tray and the second bracket for drawing the second bracket toward the battery tray to hold the battery between the battery tray and the second bracket;
    whereby, length adjustment of the holddown and disconnection of the first and second brackets require only relative linear movement between the first and second brackets substantially along the cavity axis.

2. The holddown of claim 1 wherein the first cross rod and cavity are formed to provide for infinite adjustment of distance between the first and second side members when the first and second brackets are assembled, thereby allowing use of the holddown with batteries of varying sizes.

3. The holddown of claim 2 wherein the second cross rod forms the cavity.

4. The holddown of claim 3 wherein the cavity is bounded on three sides by the second cross rod.

5. The holddown of claim 4 wherein the second cross rod includes a top wall and spaced side walls which bound the cavity, the first cross rod has a width, and the spacing between the side walls is at least equal to the width of the first cross rod.

6. The holddown of claim 5 further including a sleeve portion spaced from the top wall such that the top wall, side walls and sleeve portion define an opening to the cavity, the opening being completely bounded, wherein the first cross rod has a height and the spacing between the top wall and sleeve portion is at least equal to the height of the first cross rod.

7. The holddown of claim 4 wherein the second cross rod has a length, and the cavity extends substantially the entire length.

8. The holddown of claim 2 wherein the side members are substantially parallel and define a lateral direction, and wherein the cavity axis is substantially perpendicular to the lateral direction.

9. The holddown of claim 2 wherein:
the first bracket includes a first ear integrally formed as a single piece with the first cross rod and extending from the first side member in a direction opposite the first top member, the first ear including a first aperture; and
the second bracket includes a second ear integrally formed as a single piece with the second cross rod and extending from the second side member in a direction opposite the second top member, the second ear including a second aperture.

10. The holddown of claim 9 wherein:
the first drawing element includes a first bolt for connection with respect to the battery tray and for extending through the first aperture; and
the second drawing element includes a second bolt for connection with respect to the battery tray and for extending through the second aperture;
whereby the first and second brackets are drawn toward the battery tray to hold the battery between the battery tray and the brackets by inserting the first and second bolts through the first and second apertures, respectively, and tightening a nut on each of the first and second bolts.

11. An adjustable holddown for a battery positioned in a battery tray, the battery having a top and first and second opposite sides, the holddown comprising:
a first bracket having a first top member for abutting the top of the battery, a first side member for abutting the first side of the battery, a first cross rod for extending over the top of the battery, and a first mount for connecting with a drawing element for drawing the first bracket toward the battery tray to hold the battery between the battery tray and the first bracket;
a second bracket having a second top member for abutting the top of the battery, a second side member for abutting the second side of the battery, a second cross rod for extending over the top of the battery, a cavity for slidably receiving the first cross rod, the cavity defining a cavity axis such that the relative linear movement between the first and second brackets substantially along the cavity axis allows for disconnection of the first and second bracket without any other movement of holddown components, and a second mount for connecting with a drawing element for drawing the second bracket toward the battery tray to hold the battery between the battery tray and the first bracket;
whereby, the first cross rod and cavity are dimensioned such that, upon receipt of the first cross rod within the cavity the first and second brackets remain engaged to one another without connection to the drawing element.

12. The adjustable holddown of claim 11 wherein length adjustment of the holddown requires only relative movement between the first and second brackets substantially along the cavity axis.

13. The holddown of claim 11 wherein the first cross rod and cavity are formed to provide for infinite adjustment of distance between the first and second side members when the first and second brackets are assembled, thereby allowing use of the holddown with batteries of varying sizes.

14. The holddown of claim 13 wherein the second cross rod forms the cavity.

15. The holddown of claim 14 wherein the second cross rod includes a top wall and spaced side walls and a sleeve portion spaced from the top wall, the top wall and side walls defining the cavity and the top wall, side walls and sleeve portion defining an opening to the cavity, the opening being completely bounded, and wherein the first cross rod has a height and a width, the spacing between the top wall and sleeve portion is at least equal to the height of the first cross rod and the spacing between the side walls is at least equal to the width of the first cross rod.

16. The holddown of claim 11 wherein:
the first bracket includes a first ear integrally formed as a single piece with the first cross rod and extending from the first side member in a direction opposite the first top member, the first ear including the first mount, the first mount being a first aperture; and
the second bracket includes a second ear integrally formed as a single piece with the second cross rod and extending from the second side member in a direction opposite the second top member, the second ear including the second mount, the second mount being a second aperture.

17. The holddown of claim 16 wherein the drawing element includes a first bolt for connection with respect to the battery tray and for extending through the first aperture; a second bolt for connection with respect to the battery tray and for extending through the second aperture, whereby the first and second brackets are drawn toward the battery tray to hold the battery between the battery tray and the brackets by inserting the first and the second bolts through the first and second apertures, respectively, and tightening a nut on each of the first and second bolts.

18. The adjustable holddown of claim 11 wherein the length of the holddown is adjustable when connected to the drawing element.

19. The adjustable holddown of claim 11 wherein the first cross rod and cavity are dimensioned such that, upon receipt of the first cross rod within the cavity unintentional separation if the first and second brackets is prevented.

20. A method of holding a battery assembly in a battery tray and removing the battery assembly from the battery tray, the battery assembly having a top and first and second opposite sides spaced apart by a distance, the method comprising the steps of:
providing a first bracket having a first top member for abutting the top of the battery assembly, a first side member for abutting the first side of the battery assembly, a first cross rod for extending over the top of the battery assembly, and a first mount;
providing a second bracket having a second top member for abutting the top of the battery assembly, a second side member for abutting the second side of the battery assembly, a second cross rod for extending over the top of the battery assembly, a cavity for slidably receiving the first cross rod, the cavity defining a cavity axis, and a second mount;
providing a drawing element;
inserting the first cross rod into the cavity along the cavity axis for a desired depth such that the space between the first and second side members is of a desired effective length substantially equal to the distance;
connecting the drawing element to the first and second mounts;
tightening the drawing element such the brackets are drawn toward the battery tray to hold the battery assembly between the battery tray and the brackets;
providing relative linear movement between the first and second brackets only along the cavity axis such that the first and second brackets are disconnected; and removing the battery assembly from the tray;

wherein, before disconnection of the first and second brackets, the first and second side members abut the opposite sides of the battery assembly, the first and second top members abut the top of the battery assembly and the battery assembly is sandwiched between the brackets and the tray.

* * * * *